US005674099A

United States Patent [19]
Muramatsu et al.

[11] Patent Number: 5,674,099
[45] Date of Patent: Oct. 7, 1997

[54] OUTBOARD DRIVE EXHAUST SYSTEM

[75] Inventors: Masahiro Muramatsu; Kazunori Yasukawa; Norihito Mizusawa, all of Shizuoka-ken, Japan

[73] Assignee: Sanshin Kogyo Kabushiki Kaisha, Hamamatsu, Japan

[21] Appl. No.: 562,070

[22] Filed: Nov. 22, 1995

[30]    Foreign Application Priority Data

Nov. 25, 1994  [JP]  Japan ................................. 6-291075

[51] Int. Cl.$^6$ ................................................. B63H 21/92
[52] U.S. Cl. ........................................................ 440/89
[58] Field of Search ........................................ 440/88, 89

[56]            References Cited

U.S. PATENT DOCUMENTS

| | | | |
|---|---|---|---|
| 3,045,423 | 7/1962 | Hulsebus | 440/89 |
| 3,552,121 | 1/1971 | Kitagawa et al. | 440/89 |
| 5,100,351 | 3/1992 | Shibata | 440/89 |
| 5,346,417 | 9/1994 | Isogawa . | |
| 5,494,467 | 2/1996 | Sohgawa et al. | 440/89 |

*Primary Examiner*—Stephen Avila
*Attorney, Agent, or Firm*—Knobbe, Martens, Olson & Bear LLP

[57]             ABSTRACT

An exhaust system for a marine outboard drive emits engine exhaust gases to the atmosphere at a point proximate to the water surface of the body of water in which the outboard drive is operated. An upper cowling of the outboard drive houses an engine. A drive shaft housing depends from the lower tray of the cowling and terminates at an intermediate housing. The intermediate housing connects a lower propulsion unit to the drive shaft housing. The exhaust system communicates with an exhaust manifold of the engine and extends downwardly through the drive shaft housing. An expansion chamber of the exhaust system is formed principally within the intermediate housing, below the drive shaft housing and above the propulsion device supported by the lower propulsion unit. An exhaust vent communicates with the expansion chamber and emits engine exhaust gases at a point behind the outboard drive near the lower end of the drive shaft housing.

21 Claims, 6 Drawing Sheets

5,674,099

OUTBOARD DRIVE EXHAUST SYSTEM

BACKGROUND OF THE INVENTION

1. Field of the Invention

The present invention generally relates to a marine propulsion system, and more particularly to an exhaust system for an outboard drive.

2. Description of Related Art

Outboard motors commonly discharge engine exhaust beneath the water level of the body of water in which the outboard drive is operated in order to silence exhaust noise. For this purpose, the exhaust system typically includes an exhaust pipe which extends through a drive shaft housing into an expansion chamber formed within the housing. The expansion chamber communicates with an exhaust passage formed in a lower unit of the outboard motor. Exhaust gases pass from the expansion chamber through the lower unit and discharge behind the propeller at a low pressure region created within the water by the rotating propeller.

Engine cooling water also drains from the engine of the outboard motor into the expansion chamber of the drive shaft housing and merges with exhaust gases in the chamber. The cooling water discharges from the outboard motor with the exhaust gases through the above-described exhaust system extending through the lower unit and the propeller.

Although conventional exhaust systems reduce noise above the water by emitting exhaust gases into the water, prior exhaust systems produce significant noise beneath the water surface. Several disadvantages are associated with such noise. In fish hatchery and cultivation areas, engine exhaust noise propagating through the water causes the fish to scatter away from the source of the noise, i.e., away from the outboard motor. The fleeing fish tend to swim into boundary nets, which commonly encircle the cultivation area, and become entangled in the nets and die.

Excessive underwater noise emission also annoys divers who work underwater. Watercrafts thus commonly decrease their speed in areas where working divers are present.

Water pollution also is a problem associated with the discharge of exhaust gases into the water. The water absorbs carbon, hydrocarbons and other byproducts as the exhaust gases percolate toward and escape through the water surface.

Others have addressed the aforementioned problems by emitting exhaust gases directly to the atmosphere rather than to the water. An example of an outboard motor with an atmosphere discharge exhaust system is disclosed in Japanese Utility Model No. 55-19082. The outboard motor includes a large expansion chamber positioned within the drive shaft housing. Exhaust gases flow from the engine into the expansion chamber. The expanded gases then flow to the atmosphere through an emission pipe, which is connected to the chamber and extends through a wall of the housing.

Although this prior exhaust system quiets engine exhaust noise, the large expansion chamber positioned within the drive shaft housing consequently increases the size of the housing. The increased housing size adds weight to the outboard motor (which increases the drag on the watercraft) and increases the cost of the motor. The resultant width increase of the housing at the height of the transom also decreases the steering angles of the motor.

SUMMARY OF THE INVENTION

A need therefore exists for an exhaust system for a marine outboard drive which emits silenced exhaust gases directly to the atmosphere rather than to the water, without significantly increasing the size of the drive shaft housing.

In accordance with an aspect of the present invention, an outboard drive comprises an engine having an exhaust system. A drive shaft housing is positioned below the engine and an intermediate housing is attached to a lower end of the drive shaft housing. A lower propulsion unit depends from the intermediate housing. The drive shaft housing has a first conduit communicating with the exhaust system of the engine. The intermediate housing includes an expansion chamber which communicates with the first conduit of the drive shaft housing.

Another aspect of the present invention involves an outboard drive for operating in a body of water. The drive comprises an engine which drives a propulsion device. An exhaust system communicates with the engine and extends from the engine to an expansion chamber. The expansion chamber lies above and extends over said propulsion device.

BRIEF DESCRIPTION OF THE DRAWINGS

These and other features of the invention will now be described with reference to the drawings of preferred embodiments which are intended to illustrate and not to limit the invention, and in which.

DETAILED DESCRIPTION OF PREFERRED EMBODIMENTS

Figure 1:
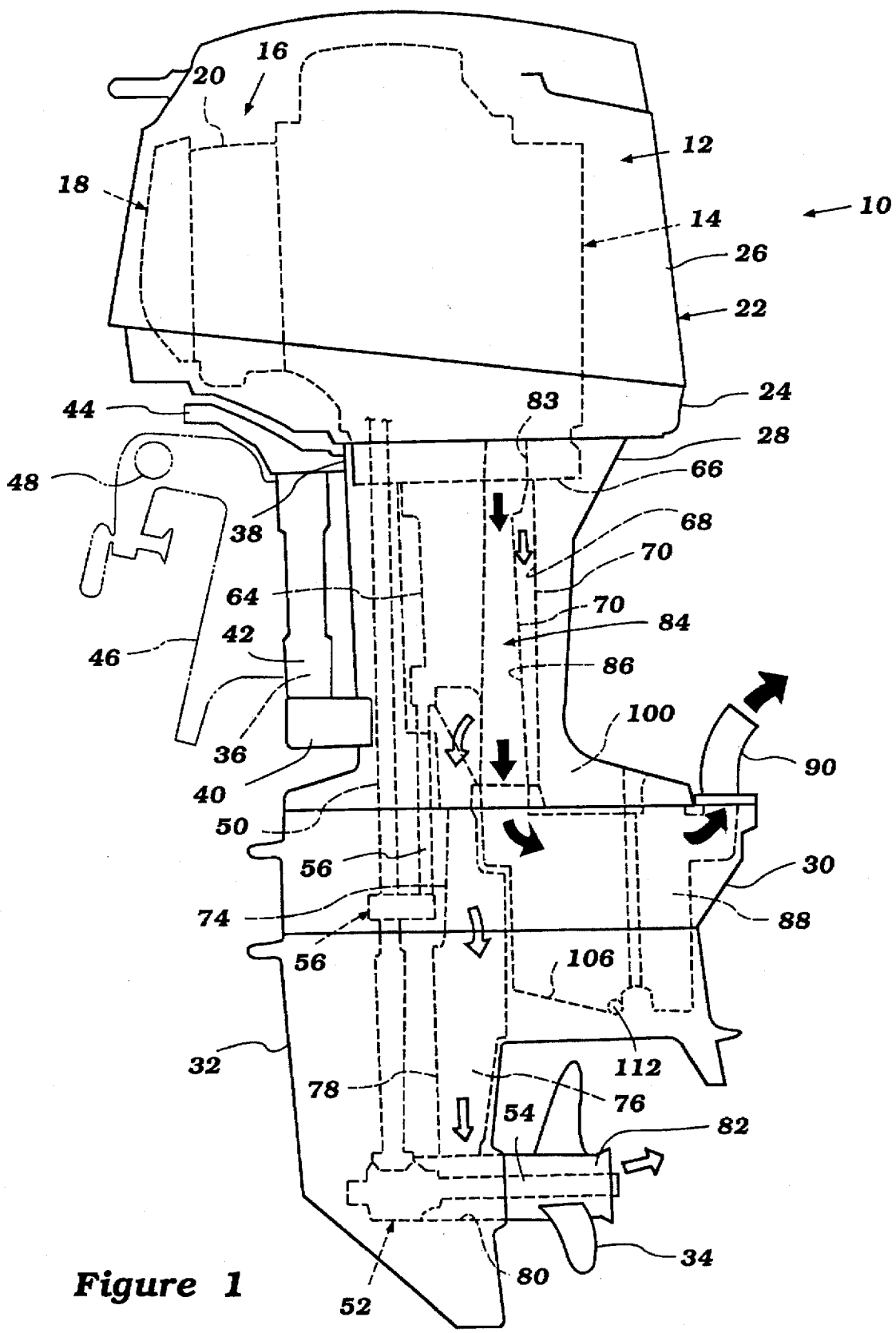
FIG. 1 is a side elevational view of a marine outboard drive in accordance with a preferred embodiment of the present invention with a cooling water discharge path illustrated by white arrows and an exhaust gas discharge path illustrated by black arrows.

FIG. 1 illustrates a marine outboard drive 10 configured in accordance with the preferred embodiment of the present invention. In the illustrated embodiment, the outboard drive 10 is depicted as an outboard motor for mounting on a transom of the watercraft (not shown). Those skilled in the art, however, will appreciate that certain aspects of the present exhaust and water discharge systems can be adapted to other types of marine drives.

The outboard drive 10 has a power head 12 which includes an engine 14. The engine desirably operates on a two-stroke principle and includes an induction system 16 mounted to the crankcase of the engine 14. The induction system 16 includes an intake silencer 18 through which air is drawn into at least one carburetor 20. It will be readily apparent to those skilled in the art, however, that the present exhaust and water discharge system described below may be employed with engines having other cylinder orientations and operating on other than a two-stroke principle.

A conventional cowling 22 surrounds the engine. The cowling 22 desirably includes a lower tray 24 and an upper cowling member 26. These components 24, 26 of the protective cowling 22 together define an engine compartment which houses the engine 14.

A drive shaft housing 28 extends downwardly from the lower tray 24 and terminates at an intermediate housing 30. The intermediate housing 30 lies between the lower end of the drive shaft housing 28 and an upper end of a lower unit 32. The lower unit 32 supports a propulsion device 34, as described below.

A steering shaft 36 is affixed to the drive shaft housing at upper and lower brackets 38, 40. The brackets 38, 40 support the shaft 36 for steering movement within a swivel bracket 42. Steering movement occurs about a generally vertical steering axis which extends through the steering shaft 36. A steering arm 44 which is connected to an upper end of the steering shaft 36 extends in the forward direction for steering of the outboard drive 10, as is known in the art.

The swivel bracket 42 also is pivotably connected to a clamping bracket 46 by a pin 48. The clamping bracket 46, in turn, is configured to attach to the transom of the watercraft (not shown). This conventional coupling permits the outboard drive 10 to be pivoted relative to the pin 48 to permits adjustment to the trim position of the outboard drive 10 and for tilt up of the outboard drive 10.

Although not illustrated, it is understood that a conventional hydraulic tilt and trim cylinder assembly, as well as a conventional hydraulic steering cylinder assembly can be used as well with the present outboard drive 10. The construction of the steering and trim mechanism is considered to be conventional and, for that reason, further description is not believed necessary for an appreciation and understanding of the present invention.

As schematically illustrated in FIG. 1, the engine 14 is mounted conventionally with its output shaft (i.e., crankshaft) rotating about a generally vertical axis. The crankshaft (not shown) drives the drive shaft 50 which is coupled to the crankshaft in a known manner.

The drive shaft 50 depends from the power head 12 of the outboard drive 10 into the drive shaft housing 28. The drive shaft 50 extends through and is journaled within the drive shaft housing 28 and the intermediate housing 30, and extends into the lower unit 32.

In the lower unit 32, the drive shaft 50 drives a gear pinion at its lower end. The gear pinion forms part of a transmission 52 which selectively couples the drive shaft 50 to a propulsion shaft 54 coupled to the propulsion device 34. The transmission 52 desirably is a forward/neutral/reverse-type transmission to selectively drive the propulsion device 34 in a reverse or forward direction.

The propulsion device 34 desirably comprises a propeller, a hydrodynamic jet, or the like. In the illustrated embodiment, the propulsion device 34 includes a single propeller; however, it is understood that a counter-rotational propeller device can be used as well.

FIG. 1 also schematically illustrates a water circulation system used to cool the engine. The water circulation system includes a water pickup port (not shown) which desirably lies at a point proximate to a leading or front edge of the lower unit (i.e., proximate to the side of the lower unit closest to the watercraft transom).

A water pump 56 draws water through the pick-up port into the water circulation system. For this purpose, the drive shaft 50 drives the water pump 56 through conventional means. As seen in FIG. 1, the water pump 56 desirably lies within the intermediate housing 30 at a point proximate to the joint between the intermediate housing 30 and the lower unit 32. This position of the water pump 52 facilitates easy access for maintenance and service.

The water pump 56 pumps water up to the engine 14 through a water delivery passage. As best understood from FIG. 2, a cooling water conduit 58 connects to the effluent port of the water pump 56 and extends outwardly through the intermediate housing 30 and into the drive shaft housing 28. The conduit 58 attaches to a tube 60 which places the cooling water conduit 58 in connection with a cooling water inlet passage 62 formed within the drive shaft housing 28. Internal dividing walls 64 formed within the drive shaft housing 28 define the water inlet passage 62. The walls 64 also separate the water inlet passage 62 from the discharge passages, which are described below, and from the drive shaft 50 and the associated lubricant passages and journal arrangement.

The water inlet passage 62 communicates with water jacket passages in the engine cylinder block and cylinder head. In this manner, water from the inlet passage 62 flows through the cylinder block and cylinder head, flowing around the cylinder bores, exhaust passages and exhaust manifold. The cooling water conducts thermal heat from the engine 14 so as to cool the engine cylinder block and cylinder head.

The cooling water exits the engine through a water jacket outlet and flows into an exhaust guide 66. The exhaust guide 66 is attached to the lower side of the engine 14. A plurality of cooling water passages extend through the guide 66, as known in the art.

As seen in FIG. 1, the exhaust guide 66 generally lies at the upper end of the drive shaft housing 28 when assembled. The exhaust guide 66 includes an effluent port which communicates with a cooling water discharge passage 68 formed within the drive shaft housing 28. Dividing walls 70 within the drive shaft housing 28 define the discharge passage 68. The dividing walls 70 extend from the exhaust guide effluent port down through the drive shaft housing 28 in a generally vertical direction. The white arrows shown in FIG. 1 illustrate the water discharge path through the drive shaft housing 28.

Figure 2:
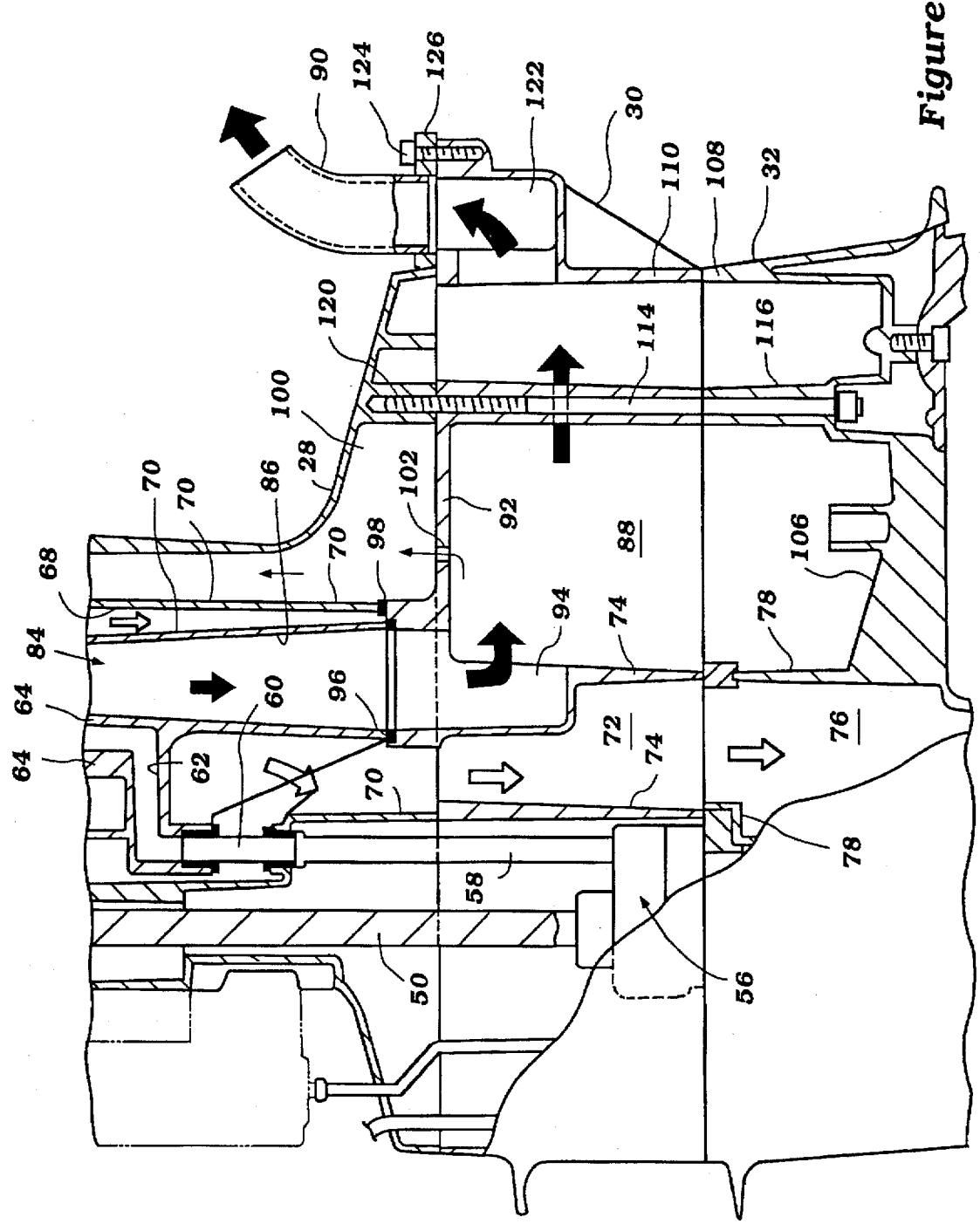
FIG. 2 is an enlarged, partial sectional, side elevational view of an intermediate housing, drive shaft housing and lower unit of the marine outboard drive of FIG. 1.

As seen in FIG. 2, the water discharge passage 68 of the drive shaft housing 28 communicates with a discharge conduit 72 formed within the intermediate housing 30. The discharge conduit 72 extends through the intermediate housing 30 in a generally vertical direction. Vertically extending dividing walls 74 within the intermediate housing 30 form the conduit 72. The upper mouth of the conduit 72 generally corresponds in shape and size with the lower end of the water discharge passage 68 of the drive shaft housing 28.

The discharge conduit 72 of the intermediate housing 30 also communicates with a cooling water passage 76 formed within in the lower unit 30. Dividing walls 78 within the lower unit 32 define the passage 76. As schematically illustrated in FIG. 1, a lower end of the cooling water passage 76 communicates with a discharge passage 80 also formed within the lower unit 32. In the illustrated embodiment, the discharge passage 80 extends about a bearing carrier (not shown) and the propulsion shaft 54 of the lower unit 32 in a direction that is generally perpendicular to a vertical axis of the cooling water passage 76. The rear end of the discharge passage communicates with discharge conduits formed within the hub 82 of the propeller 34 to direct the flow of cooling water through the propulsion device 34. In this manner, warmed cooling water from the engine is discharged to a submerged region of reduced water pressure behind the propulsion device 34.

FIG. 1 also illustrates an exhaust system of the outboard drive. An exhaust manifold (not shown) of the engine 14 communicates with an exhaust conduit 83 formed within the exhaust guide 66. The exhaust system also includes an exhaust pipe 84 which extends through the drive shaft housing. The exhaust pipe 84 is attached to the lower side of the exhaust guide 66 to place the exhaust air path 86 formed within the pipe 84 in communication with the exhaust conduit formed through the exhaust guide 66. The exhaust pipe 84 terminates in an expansion chamber 88 formed within the intermediate housing 30 and lower unit 32. As best seen in FIG. 2, the vertically extending dividing walls 74, 78 of the intermediate housing 30 and lower unit 32 separate the expansion chamber 88 from the discharge conduit 72 and the cooling water passage 76. The expansion chamber 88 in turn communicates with an emission pipe 90 positioned at the rear of the outboard drive 10.

As understood from FIG. 2, the expansion chamber 88 has a significantly larger cross-sectional area than the exhaust pipe 84 extending through the drive shaft housing 28 or the emission pipe 90. The change from a small cross-sectional flow area to a significantly larger cross-sectional flow area to a smaller cross-sectional flow area diminishes pressure pulses in the exhaust gas stream and consequently reduces the noise produced by the engine exhaust. When the engine is running, the engine exhaust ports rapidly open and close. Each time the exhaust ports open, a blast of hot exhaust gas shoots out of the engine. The arrangement of the expansion 88 chamber within the exhaust system cancels out the pressure pulsations in the exhaust gases, and thereby quiets engine operation.

As seen in FIG. 2, the intermediate housing 30 includes an upper wall 92 that defines a portion of the upper surface of the expansion chamber 88. The dividing wall 74 between the discharge conduit 72 and the expansion chamber 88 forms a portion of a front side of the expansion chamber 88. At the upper end of the dividing wall 74, a generally tubularly shaped inlet port 94 is formed between the front dividing wall 74 and the upper wall 92. A lower end of the port 94 is partially closed, and the lower side is open to give a generally "L" shape to the flow path through the port 94.

The inlet port 94 extends upwardly into the drive shaft housing 28 to mate with the lower end of the exhaust pipe 84. A gasket 96 seals the joint between the exhaust pipe 84 and the inlet port 94 of the expansion chamber 88. The upper wall 92 also cooperates with the vertical dividing walls 70 in the drive shaft housing 28 that defines the water discharge passage 68 through the drive shaft housing 28. As seen in FIG. 2, a gasket 98 seals the joint between the lower end of the dividing walls 70 and the upper end of the upper wall 92 that projects into the drive shaft housing 28 when assembled. This arrangement also forms an auxiliary exhaust air path 100 inside the drive shaft housing 28. The gaskets 96, 98 seal the auxiliary exhaust air path 100 from the water discharge passage 68 and the exhaust pipe 84.

As seen in FIG. 2, the upper wall 92 of the expansion chamber includes a passage hole 102 which places the expansion chamber 88 in communication with the auxiliary exhaust air path 100 inside the drive shaft housing 28. The size of the passage hole 102 is significantly less (e.g., at least half the size) than the cross-sectional flow area of the emission pipe 90. When excessive back pressure exists at the effluent end of the emission pipe 90—such as when the emission pipe opening is submerged with the watercraft under an idle running condition—exhaust gases flow from the expansion chamber 88 through the passage hole 102 and into the auxiliary exhaust air path 100. Exhaust gases pass through the auxiliary exhaust air path 100 and emit to the atmosphere through a vent (not shown) positioned on the rear side of the drive shaft housing 28. The vent desirably lies at a point above the intermediate housing 30 and below the lower tray 24 of the cowling 22.

The lower end of the intermediate housing inner dividing walls 74 cooperates with the inner dividing walls 78 of the lower unit 32. Seals 104 desirably lies between the adjoining ends of the inner walls 74, 78 to seal the expansion chamber 88 from the water discharge passage 76.

The lower unit inner wall 78 adjacent to the expansion chamber 88 forms a portion of a generally concave recess 106 positioned on the rear upper side of the lower unit 32. When the lower unit 32 is attached to the intermediate housing 30, as seen in FIG. 2, the recess 106 forms the lower portion of the expansion chamber 88. As such, an outer wall 108 of the lower unit 32 mates with an outer wall 110 of the intermediate housing 30 to complete the expansion chamber 88 and to present a smooth exterior surface of the outboard drive 10 at the joint between the two housings 30, 32.

As best seen in FIG. 1, the expansion chamber 88 desirably lies above and extends at least partially over the propulsion device 34. In the illustrated embodiment, the expansion chamber 88 extends entirely over and beyond the rear end of the single propeller of the propulsion device 34. This position of the expansion chamber allows for an adequately sized expansion chamber 88 to effectively silence exhaust noise without increasing the size of the drive shaft housing 28. It also does not significantly alter the common position of the other components of a conventional outboard motor.

The lower unit 32 desirably includes at least one drainage hole 112 in communication with the expansion chamber 88. In the illustrated embodiment, the drainage hole extends from a side of the lower unit 32 into the lower portion of the expansion chamber 88 formed by the concave recess 106. The drainage hole 112 is positioned such that any water that flows into the expansion chamber 88 through the emission pipe 90 may drain from the expansion chamber 88 through the drainage hole 112 when the drainage hole 112 lies above the surface of the water in which the watercraft is operated (e.g., when the watercraft is up on plane). Of course, other positions of the drainage hole 112 are possible to achieve this function. A one-way valve or similar flow direction device (not shown) may be used with the drainage hole 112 to allow water within the chamber 88 to drain through the hole 112, but prevent the inflow of water into the chamber 88 through the drainage hole 112.

As seen in FIG. 2, at least one bolt 114 attaches the lower unit 32 and the intermediate housing 30 to the lower end of the drive shaft housing 28. For this purpose, both the lower unit 30 and the intermediate housing 32 define generally tubular sections 116, 118 which project into the expansion chamber 88. The tubular sections 116, 118 cooperate with each other so as to form an elongated through bore from a lower surface on the underside of the lower unit 32 to the upper wall 92 of the expansion chamber 88. The through hole aligns with a threaded aperture 120 formed in the lower end of the drive shaft housing 28. The elongated bolt 114 extends through the through bore and its threaded upper end threads into the threaded aperture 120 to secure the lower unit 32 to the lower end of the drive shaft housing 28 with the intermediate housing 30 interposed therebetween.

A generally tubular outlet port 122 is formed at the upper end of the outer wall 110 of the intermediate housing 30. In the illustrated embodiment, the outlet port 122 defines an L-shaped flow path. This allows exhaust gas flow into the port 122 from the side of the chamber 88 and out of the port 122 through the upper end of the intermediate housing 30. The outlet port 122 also communicates with the expansion chamber 88 on the side of the expansion chamber 88 opposite that of the inlet port 94.

The emission pipe 94 attaches to the outlet port 122 of the expansion chamber 88. In the illustrated embodiment, the emission pipe 90 has a tubular shape which extends upwardly and curves to the rear so as to direct exhaust gases away from the outboard drive 10. A screw 124 attaches a lower flange 126 of the emission pipe 90 to the upper end of the intermediate housing 32.

Thus, as illustrated by the black arrows in FIGS. 1 and 2, exhaust gas flows from the engine 14 into the exhaust pipe 84 extending through the drive shaft housing 28. Exhaust gases flow through the emissions pipe 84 into the expansion chamber 88 formed within the intermediate housing 30 and the lower unit 32. Pressure pulses within the exhaust gas stream are dissipated within the expansion chamber 88, which acts as a pressure reducer. Exhaust gases at a reduced pressure then flow from the expansion chamber 88 through the emissions pipe 90 to the atmosphere. This exhaust system effectively quiets engine exhaust noise and emits exhaust directly to the atmosphere without increasing the size of the cowling 22 or the drive shaft housing 28. As such, the cost of the outboard drive 10 can be reduced over outboard drives incorporating previously suggested exhaust systems that emit to the atmosphere. The effecting steering range of outboard drive 10 also is not lessened from that of conventional drives which exhaust through the propeller hub into the water.

Figure 3:
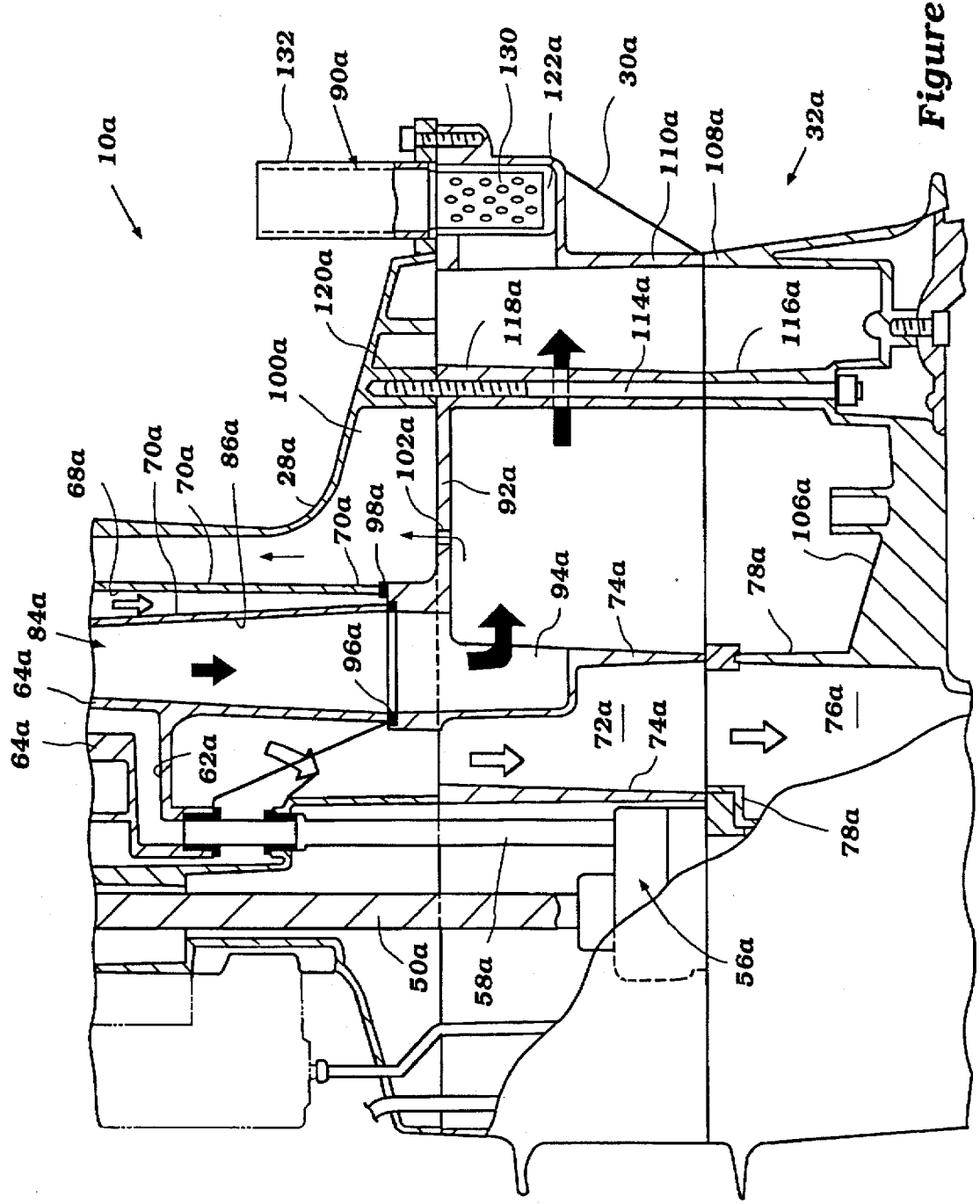
FIG. 3 is an enlarged, partial sectional, side elevational view of an intermediate housing, drive shaft housing and lower unit of a marine outboard drive configured in accordance with another preferred embodiment of the present invention.

FIG. 3 illustrates another preferred embodiment of the present exhaust system with a different configuration of the emission pipe 90a. Where appropriate, like numbers with an "a" suffix have been used to indicate like parts of the embodiments for ease of understanding.

As seen in FIG. 3, the emission pipe 90a generally has a cylindrical shape with an annular flange 126a that circumscribes the tube at about its mid-section. At least one screw 124a passes through a through hole in the flange 126a and threads into a threaded aperture formed on the upper rear end of the intermediate housing 30a.

A reduced diameter section 130 of the emission pipe 90a extends down into the outlet port 122a of the expansion chamber 88a. The tubular shape of this lower section 130 of the emission pipe 90a has a size slightly smaller than the cylindrical shape vertical bore of the outlet port 122a. This lower tubular section 130 of the emission pipe 90a includes a plurality of apertures so as to function as a conventional acoustic tube to reduce further noise emission of the emitted exhaust gases.

The upper portion 132 of the emission pipe 90a extends upwardly, beyond the upper surface of the intermediate housing 32a. In this position, exhaust gases vent to the atmosphere at a position behind the drive shaft housing 32a at a point proximate to the water surface level of the watercraft when operated under a forward drive condition. Although not illustrated, it is contemplated that the upper end of the emission pipe 90a can curve away from the rear of the outboard drive 10a similar to the previous embodiment.

Figure 4:
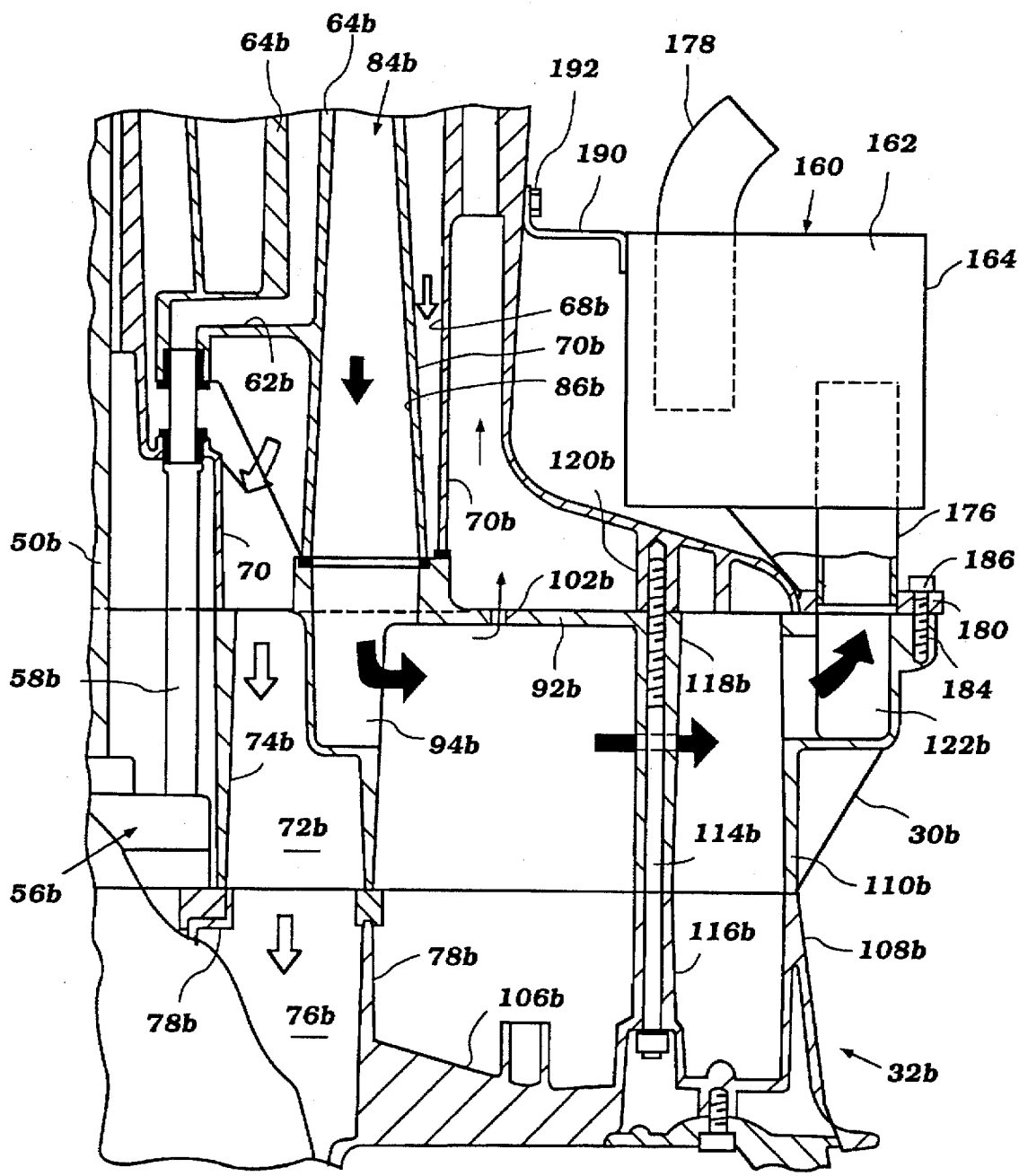
FIG. 4 is an enlarged, partial sectional, side elevational view of an intermediate housing, drive shaft housing and lower unit of a marine outboard drive configured in accordance with an additional preferred embodiment of the present invention.

FIG. 4 illustrates an additional preferred embodiment of the present exhaust system with an exhaust silencer 160 connected to the outlet port 122b of the expansion chamber 88b rather than an emission pipe as in the previous embodiments. Where appropriate, like numbers with a "b" suffix have been used to indicate like parts between the embodiments for ease of understanding.

As seen in FIG. 4, an exhaust silencer 160 is connected to the outlet port 122b of the expansion chamber 88b, sitting above the intermediate housing 30b directly behind the drive shaft housing 28b. The exhaust silencer 160 includes a resonance chamber defined within an enclosure 164.

Figure 6:
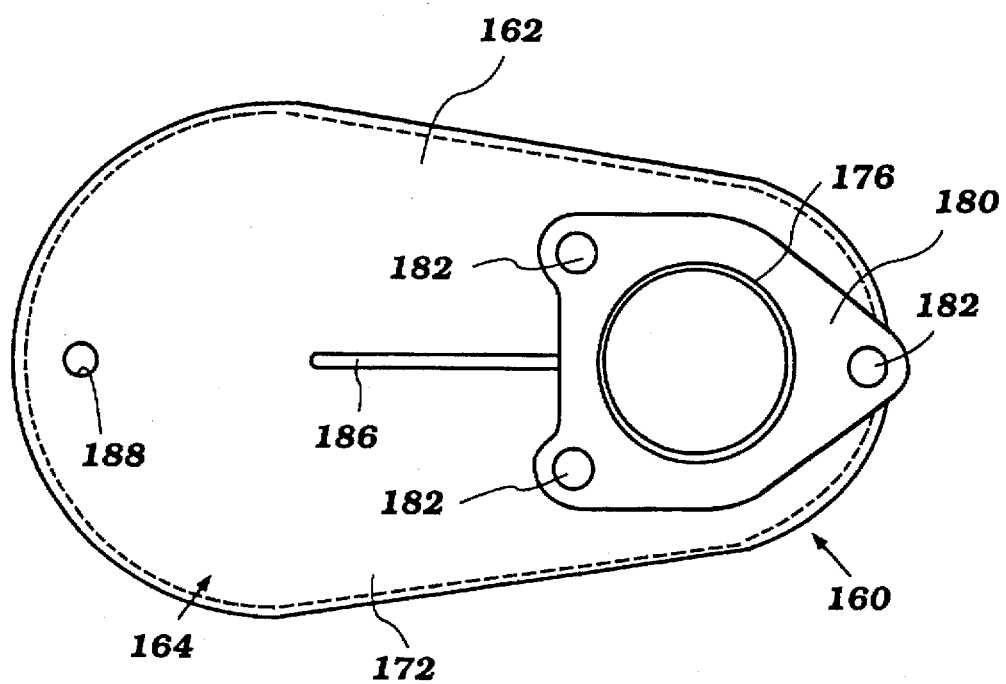
FIG. 6 is a bottom plan view of the exhaust silencer of FIG. 5.
Figure 7:
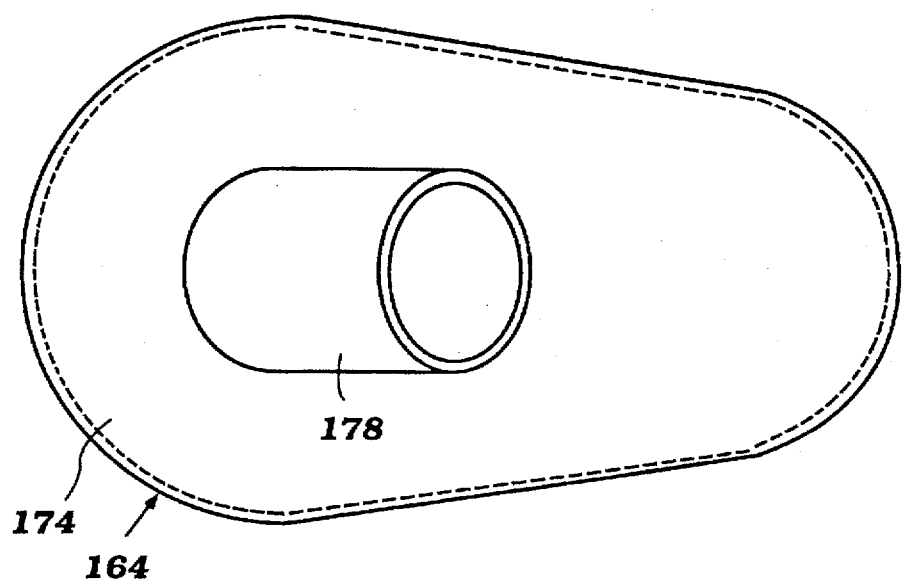
FIG. 7 is a top plan view of the exhaust silencer of FIG. 5.

In the illustrated embodiment, the enclosure 164 forming the resonance chamber 162 generally is a curvilinear body. That is, as seen in FIG. 6, the enclosure 164 has a horizontal cross-sectional shape which is defined by semi-circular ends of different radii connected together by straight side edges. The straight side edges are nonparallel and diverge away from the smaller radius end. In the illustrated embodiment, the rear end of the enclosure is smaller than the forward end. As understood from FIGS. 5 through 7, the enclosure 164 and resonance chamber 162 have a generally uniform horizontal cross-sectional shape over the height of the enclosure 164. The sides 166 of the enclosure 164 thus lie along a vertically orientated arcuate plane. As readily appreciated by one skilled in the art, however, the resonance chamber 162 can have any of a wide variety of sizes and configurations in order to suit a specific application.

Figure 5:
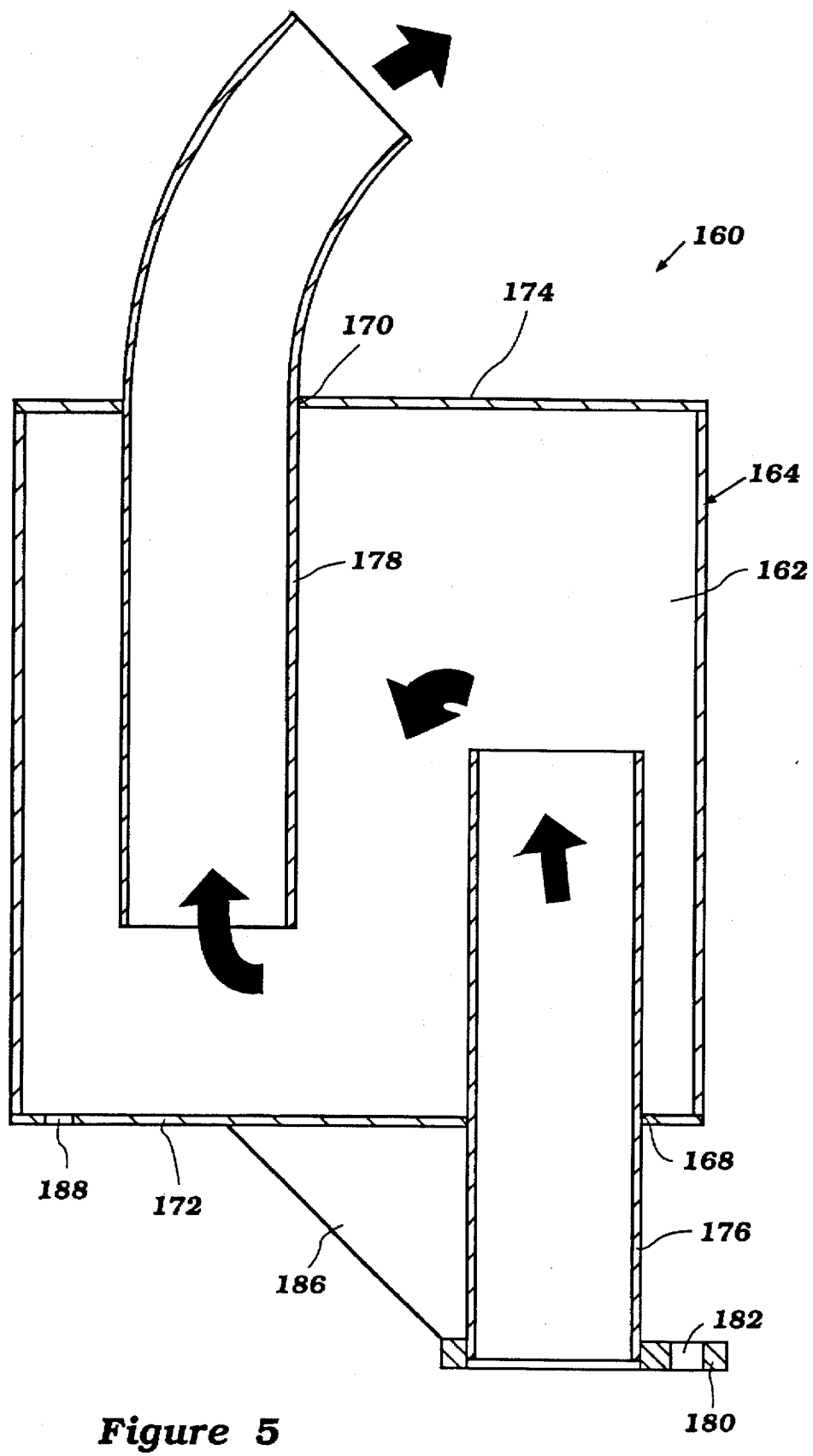
FIG. 5 is an enlarged sectional side elevational view of an exhaust silencer of the outboard drive of FIG. 4.

With reference to FIG. 5, the enclosure 164 includes at least one inlet opening 168 and at least one outlet opening 170, both of which open into the resonance chamber 162. In the illustrated embodiment, the inlet opening 168 extends through a lower wall 172 of the exhaust silencer 160 and the outlet opening 170 extends through an upper wall 174 of the exhaust silencer enclosure 164. The openings 168, 170 are positioned at opposite ends of the resonance chamber 162.

In the illustrated embodiment, the exhaust silencer 160 desirably functions as a helmholtz resonator. For this purpose, a plurality of conduits, such as acoustic tubes, extend into the resonance chamber 162. In the illustrated embodiment, a pair of acoustic tubes 176, 178 extend into the resonance chamber 162 through the openings 168, 170. A first acoustic tube 176 extends from a point outside the resonance chamber 168 through the inlet opening 168 and into the chamber 162. The first acoustic tube 176 includes a generally straight section that extends into the resonance chamber 162 to a point equal to about the height of the mid-section of the chamber 162. A second acoustic tube 178 extends through the outlet opening 170. The lower portion of the second acoustic tube 178 also has a straight shape and extends into the resonance chamber 162 to a point within a chamber 162 below the mid-height of the resonance chamber 162. In this manner, the ends of the first and second acoustic tubes 176, 178 overlap in the vertical direction within the resonant chamber 162. The length of the tubes 176, 178 and the degree of overlap between the tubes 176, 178 can be tuned to minimize the emission noise from the exhaust system, as known in the art.

The black arrows shown in FIG. 5 illustrate exhaust gas flow through the exhaust silencer 160. The overlapping arrangement of the corresponding ends of the acoustic tubes 176, 178 in the resonance chamber 162 causes the exhaust gas to be introduced into the resonance chamber 162 at a point above the opening to the second acoustic tube 178. The inlet to the second acoustic tube 178 is positioned such that the flow of exhaust gases from the first acoustic tube 176 cannot flow directly into the second acoustic tube 178. In the illustrated embodiment, this is achieved by having the outlet end of the first acoustic tube 176 lie at a point above the lower inlet end of the second acoustic tube 178. It is understood, however, that other arrangements of the acoustic tubes 176, 178 within the resonance chamber can produce the desired result. It also is contemplated that the baffles or other dividers can be placed within the resonance chamber 162 so as to further reduce exhaust noise, as known in the art.

As best understood from FIGS. 5 and 6, the first acoustic tube 176 includes a flange 180 formed at its lower end. The flange 180 includes a plurality of through holes 182. As understood from FIG. 4, the through holes 182 align with threaded apertures 184 formed at the upper rear end of the intermediate housing 30b when the exhaust silencer 160 is placed on the intermediate housing 30b. Bolts 186 extend through the through holes 182 and thread into the threaded apertures 184 to secure the flange 180 to the upper rear end of the intermediate housing 30b.

As best seen in FIG. 5, a truss plate 186 extends between the lower wall 172 of the resonance chamber enclosure 164 and the front side of the first acoustic tubing 176. The truss plate 186 also connects to the front edge of the attachment flange 180. The truss plate 186 stabilizes the connection between the first acoustic tube 176 and the enclosure 164.

As best seen in FIGS. 5 and 6, the lower wall 172 of the enclosure 164 includes a hole 188 positioned on the front side of the enclosure 164. The hole 188 allows any water which might have entered the resonance chamber 162 through the second acoustic tube 178 to drain from the resonance chamber 162. Of course, the hole 188 can lie at other locations along the bottom wall 172 of the resonance chamber enclosure 164, and the enclosure 164 can include several holes. The combined cross-sectional area of the holes, however, should be significantly less than the cross-sectional flow diameter through the second acoustic tube 178 so as not to significantly affect the function of the exhaust silencer 160.

The upper portion of the second acoustic tube 178 extends through the outlet opening 170 of the enclosure upper wall 174 and curves away from the outboard drive 10b so as to emit exhaust gases away from the outboard drive 10b, similar to the emission pipe 90 shown in FIG. 2.

With reference to FIG. 4, a bracket 190 desirably is used to attach the upper end of the enclosure 164 to the rear side of the drive shaft housing 28b. A bolt 192 threaded into the drive shaft housing 28b releasably secures the bracket 190 to the housing 28b to allow the exhaust silencer 160 to be easily removed if desired.

The exhaust silencer 160 provides additional silencing of the exhaust gases. Noise emission associated with the engine 14b is therefore reduced. The non-obstructive position of the silencer also provides easily attachment to the outboard drive 10b when additional silencing may be required due of local noise ordinances or similar noise limit restrictions.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An outboard drive for operating in a body of water, said outboard drive comprising an engine having an exhaust system, said engine driving a propulsion device through a drive train that includes a drive shaft, a drive shaft housing positioned below said engine and housing a substantial portion of said drive shaft, an intermediate housing attached to a lower end of said drive shaft housing and a lower propulsion unit housing depending from said intermediate housing, said drive shaft housing having a first conduit communicating with said exhaust system of said engine, said intermediate housing including an expansion chamber communicating with said first conduit of said drive shaft housing and with a primary exhaust discharge path and a secondary exhaust discharge path, said primary exhaust discharge path arranged to open to the atmosphere.

2. An outboard drive as in claim 1, wherein said expansion chamber lies at a position toward the rear side of said intermediate housing.

3. An outboard drive as in claim 1, wherein said propulsion device includes an impeller, said lower propulsion unit housing supports said propulsion device on the rear side of the lower propulsion unit housing, and said expansion chamber of said intermediate housing is positioned to lie above said impeller of said propulsion device.

4. An outboard drive as in claim 1 additionally comprising a first vent which communicates with the expansion chamber to emit exhaust gases from the expansion chamber to the atmosphere above the body of water in which the outboard drive is operated.

5. An outboard drive as in claim 4, wherein said drive shaft housing includes an auxiliary exhaust path communicating with said expansion chamber independent of said first conduit, said auxiliary exhaust path additionally communicating with a second vent formed in said drive shaft housing.

6. An outboard drive as in claim 5, wherein a passage opening extends between said auxiliary exhaust path and said expansion chamber.

7. An outboard drive as in claim 6, wherein said passage opening is formed in an upper wall of said expansion chamber with at least a portion of said auxiliary exhaust path formed in said drive shaft housing directly above said expansion chamber.

8. An outboard drive as in claim 6, wherein said passage opening has a cross-sectional flow area smaller than the cross-sectional flow area through said first vent.

9. An outboard drive as in claim 4, wherein said vent comprises an emission pipe which projects upwardly away from said intermediate housing.

10. An outboard drive as in claim 9, wherein said emission pipe curves away from said drive shaft housing so as to direct exhaust gases away from said outboard drive.

11. An outboard drive as in claim 9, wherein said emission pipe includes a plurality of apertures in a peripheral wall of said emission pipe.

12. An outboard drive as in claim 4 additionally comprising an exhaust silencer positioned in series between said expansion chamber and said first vent.

13. An outboard drive as in claim 12, wherein said exhaust silencer is positioned above said intermediate housing and behind said drive shaft housing.

14. An outboard drive as in claim 1 additionally comprising a drainage hole extending from the exterior of the outboard drive into said expansion chamber.

15. An outboard drive as in claim 1, wherein said engine additionally comprises a cooling water circulation system extending through said engine and said drive shaft housing includes a second conduit communicating with said cooling system of said engine, said second conduit draining from said outboard drive through said lower unit independent of said exhaust system and expansion chamber.

16. An outboard drive for operating in a body of water comprising an engine which drives a propulsion device, and an exhaust system communicating with said engine and extending from said engine to an expansion chamber, said expansion chamber being positioned to lie above said propulsion device, said expansion chamber communicating with a primary exhaust outlet and an auxiliary outlet, said primary outlet having a larger flow capacity than said auxiliary outlet and being arranged to open to the atmosphere.

17. An outboard drive as in claim 16 additionally comprising a drive shaft housing positioned between said engine and said propulsion device, said expansion chamber generally lying below the level of a lower end of said drive shaft housing.

18. An outboard drive as in claim 17 additionally comprising a lower unit supporting said propulsion device and an extension member positioned between said lower unit and said drive shaft housing, said extension member housing at least a portion of said expansion chamber.

19. An outboard drive as in claim 18, wherein said expansion chamber extends between said extension member and said lower unit.

20. An outboard drive as in claim 18, wherein said drive shaft housing includes an auxiliary exhaust path communicating with said expansion chamber independent of said engine exhaust system.

21. An outboard drive as in claim 16 additionally comprising an exhaust silencer communicating with said expansion chamber to receive exhaust gases from said exhaust system after passing through said expansion chamber.

* * * * *